W. J. DILLARD AND J. D. TAYLOR.
AUTOMATIC WEATHER STRIP.
APPLICATION FILED MAY 20, 1918.
1,313,799.                                  Patented Aug. 19, 1919.
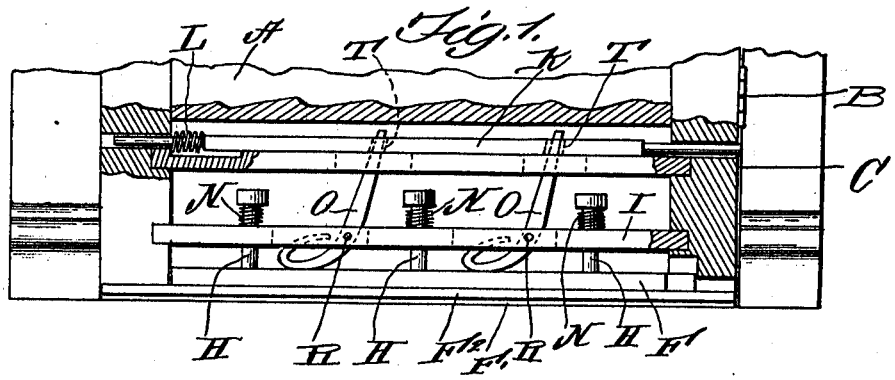
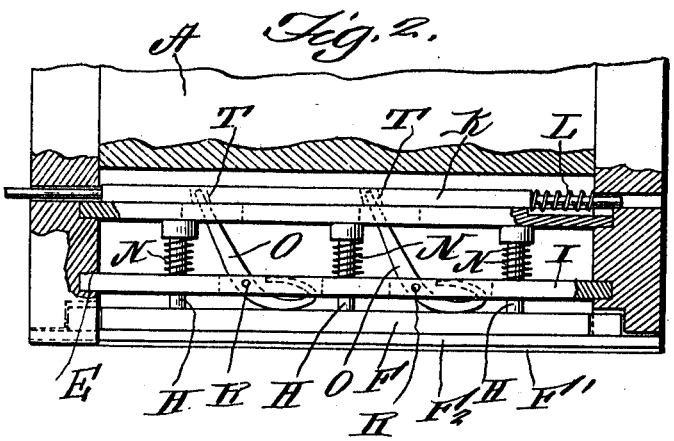
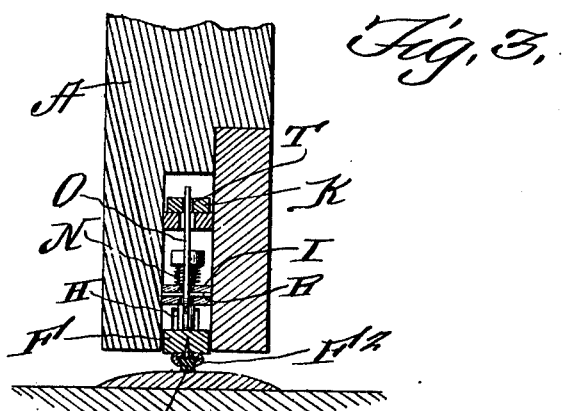

UNITED STATES PATENT OFFICE.

WILLIAM J. DILLARD AND JOHN D. TAYLOR, OF PORTLAND, OREGON.

AUTOMATIC WEATHER-STRIP.

1,313,799. Specification of Letters Patent. Patented Aug. 19, 1919.

Application filed May 20, 1918. Serial No. 235,601.

*To all whom it may concern:*

Be it known that we, WILLIAM J. DILLARD and JOHN D. TAYLOR, citizens of the United States, residing at Portland, in the county of Multnomah and State of Oregon, have invented certain new and useful Improvements in Automatic Weather-Strips; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic weather strips and consists in the provision of an attachment to a hinged door, so arranged that when the door closes, the weather strip, preferably with a tongue of rubber or fabric, may be pushed down against the sill or floor and close any space which may intervene between the same and the bottom of the door.

The invention consists of further various details of construction, combinations and arrangements of parts which will be hereinafter described, shown in the accompanying drawings and then specifically defined in the appended claim.

My invention is illustrated in the accompanying drawings which, with the letters of reference marked thereon, form a part of this specification and in which:

Figure 1 is an enlarged detail view through the lower portion of a door and jamb, the door being shown closed and the weather strip in contact with the floor.

Fig. 2 is a sectional view looking from the other direction, showing the weather strip elevated as it would appear when the door is open.

Fig. 3 is an enlarged detail in cross section showing the cam lever for operating the weather strip.

Reference now being had to the details of the drawings by letter:

A designates a door hinged as at B to the jamb C. Fastened to the bottom of the door is a frame E, in which a vertically movable strip F is mounted, said strip having laterally extending guides H movable through a cross strip I forming a part of the frame. Springs N are mounted upon the lateral extensions H and tend to normally hold the weather strip in an elevated position, there being three of said extensions H shown in the drawings. The under edge of the movable strip F is provided preferably with a tongue F' of rubber or fabric, or other suitable material, tending to form a tight joint when pressed against the floor or threshold. A longitudinally movable bar K is mounted in apertures in the end pieces of the frame E, and L is a coiled spring mounted upon the contracted portion of the bar K and bears intermediate a shoulder upon the latter and the end cross piece of the frame E. One end of the bar K projects beyond the end piece which is adjacent to the hinged edge of the door, as shown, and is adapted, when the door is closed, to contact with the frame and impart a longitudinal movement to the bar K, putting the spring L under compression, so that when the door is open, the spring L will return the bar K to its normal position.

Cam levers O are pivotally mounted upon the pins R projecting from the strip I and the cam edge of each lever bears against the upper edge of the movable strip F. The upper portions of each lever pass through slots T formed in the bar K.

In operation, it will be noted that when the door is closed, the end of the bar K projects beyond the end of the frame as it comes in contact with the frame of the door and imparts a longitudinal movement to the bar K, causing the levers O to rock upon their pivots and the cam edges of the levers will throw the strip F down, so that the tongue upon the under edge thereof will contact with the floor, thus making a tight joint to prevent wind, rain or any foreign matter from passing therethrough. When the door is opened the springs will return the bar K and the strip F to their normal positions, as will be readily understood.

What I claim to be new is:

An automatic weather strip comprising a door having a recess in its lower end and provided with two cross-bars which are spaced apart and provided with slots in staggered relation, pins passing through apertures in the lower of said bars, each pin having a head adapted to contact with the under-surface of the upper bar to limit its upper movement, coil springs upon the pins interposed between the lower bar and the heads of the pins, a longitudinally movable member resting upon the upper surface of the upper of said bars and having contracted portions extending into apertures formed in the door, curved levers pivotally mounted in slots in the lower bar and having portions extending through slots in the upper bar and engaging apertures in said longitudinally movable member, said levers having curved portions frictionally engaging the upper surface of a strip vertically slidable in said recess and actuated by said coil springs.

In testimony whereof we hereunto affix our signatures in presence of two witnesses.

WILLIAM J. DILLARD.
JOHN D. TAYLOR.

Witnesses:
R. A. IMLAY,
JEANNETTE WEST.